H. L. DOHERTY.
PROCESS OF OBTAINING AMMONIA FROM COAL.
APPLICATION FILED DEC. 23, 1909.
997,908. Patented July 11, 1911.
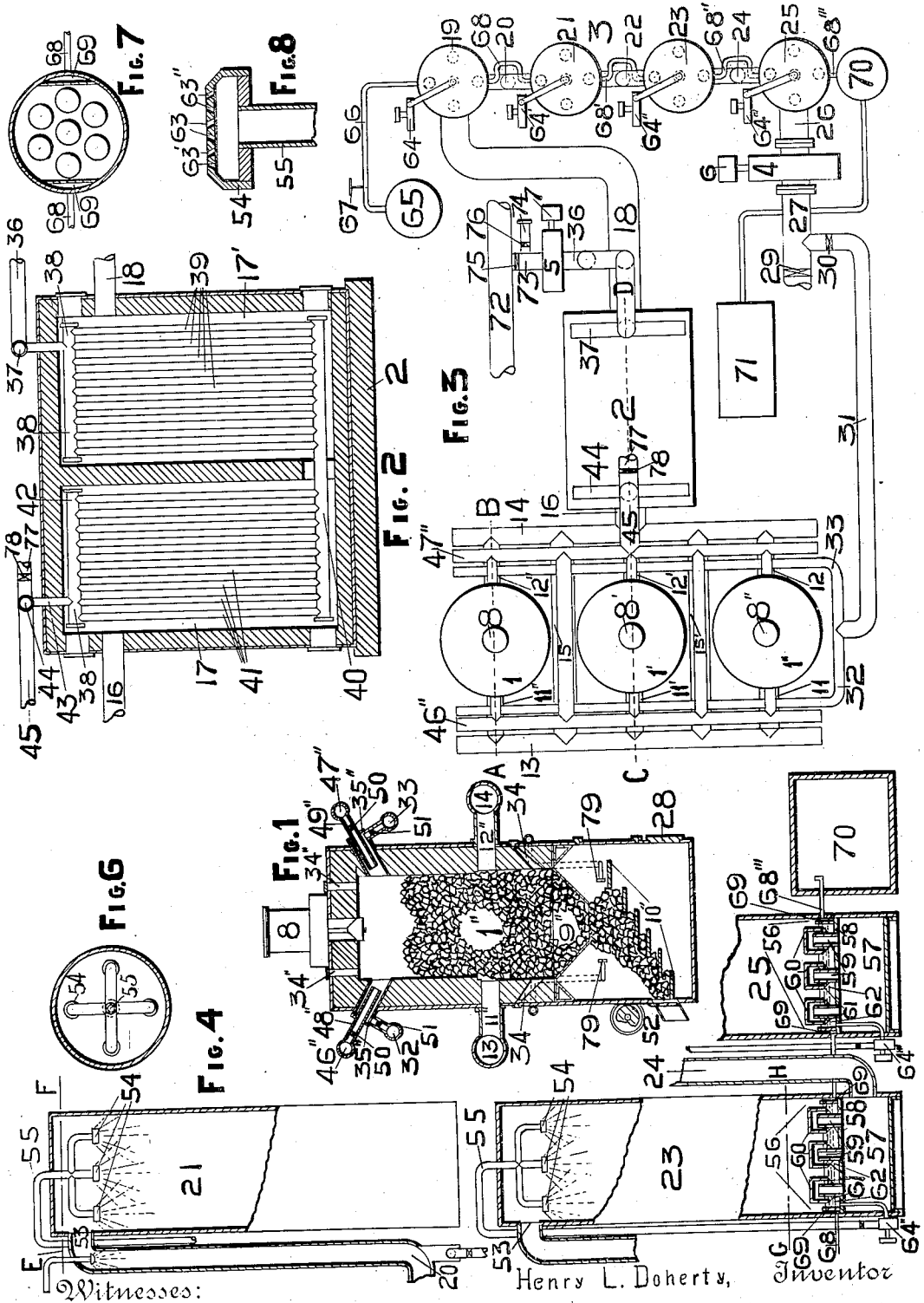
Witnesses:
Thos. J. Carter
Henry L. Doherty, Inventor
By his Attorney Frank S. Young

UNITED STATES PATENT OFFICE.

HENRY L. DOHERTY, OF NEW YORK, N. Y.

PROCESS OF OBTAINING AMMONIA FROM COAL.

997,908.

Specification of Letters Patent. Patented July 11, 1911.

Application filed December 23, 1909. Serial No. 534,693.

*To all whom it may concern:*

Be it known that I, HENRY L. DOHERTY, a citizen of the United States, residing at New York city, in the county of New York and State of New York, have invented new and useful Improvements in Processes for Recovering as Ammonia the Volatile Nitrogen of Coal, of which the following is a specification.

This invention relates to processes for recovering as ammonia the volatile nitrogen of coal and, in particular, to such processes in which the volatile nitrogen of the coal is caused to be evolved as ammonia by subjecting the coal to destructive distillation in closed chambers.

The object of my invention is the conversion of the greatest practicable proportion of the volatile nitrogen of the coal to ammonia in the destructive distillation of the coal, and its subsequent preservation in, and recovery from, the distillation gases. I accomplish these objects by carrying out the distillation of the coal in an atmosphere and at a temperature favorable to the formation of ammonia and, while maintaining a sufficiently high temperature in the distilling coal to insure a fairly perfect carbonization, so regulating and controlling the temperature to which the evolved gases are subjected that the latter are at no time exposed to a temperature above that essential to such carbonization.

In the accompanying drawings I show a form of apparatus by means of which my process may be carried out.

Figure 1 is a vertical section through one of the carbonizing chambers, taken on a plane through the line A B of Fig. 3; Fig. 2 is a similar section through the recuperator taken on a vertical plane through the line C D of Fig. 3. Fig. 3 is a diagrammatic plan of the apparatus; Fig. 4 shows a section of the upper part of tower 21 with a portion of the gas pipe connecting 19 and 21. Fig. 5 shows a part section through the last two towers 23 and 25 showing one of the sprays, one of the liquid seals, overflow, etc. Fig. 6 is a section through one of the towers on the line E F showing a plan of the spraying apparatus; Fig. 7 is a similar section on the line G H, showing a plan of the liquid-sealing-device; Fig. 8 is a section through one of the spray-caps.

The method of operation is as follows:—
In starting the apparatus, coarse cinder or coke is charged into the carbonizing chambers, 1, 1', 1'', through the charging mechanism, 8, 8', 8'', until a bed has been built up in each carbonizing chamber well above its hopper-bottom, which latter, in the chamber shown in section, is designated 9''. 10'' is the stepped grate of the carbonizing chamber, which, with 9'' supports the charge therein. When a sufficient quantity of cinder (or coke, as the case may be) has been charged into the carbonizing chambers, a fire is kindled on the bed and coke gradually charged through the hoppers 8 until there has been built up in each chamber a bed of ignited coke to above the gas "off-takes" 11'' and 12''. The gas "off-takes," 11, 11', 11'', connect with the pipe 13, the "off-takes" 12, 12', 12'', on the opposite side of the carbonizing chambers, with the pipe 14. These pipes 13 and 14 are joined by the pipes 15 and 15', the main gas conduit, 16, receiving the gas flowing through them and conducting it to the gas chamber, 17, of the recuperator 2. The discharge conduit, 18, from the recuperator connects with the tower 19 of the absorption apparatus 3. The last absorption tower, 25, is connected with the exhauster 4 by the pipe 26. When the fire has been kindled in the carbonizing chambers, the blower, 4, is started at a low speed. The door 28, of the chamber being open, air enters below the grate 10'' and passes up through the material resting on the grate, and sustains the combustion in the carbonizing chambers. The combustion gases are drawn off through 11'' and 12'' and are conducted through the conduit 16 to recuperator 2, through the gas passages of 2 and the passage 18 to the first absorption tower, 19, thence through 19, 21, 23 and 25 and their connecting passages to the exhauster and discharge through the pipe 27. The hot gases may be cooled, previous to their entry to the exhauster, by forcing air through the recuperator by means of the blower 5, allowing the hot air to waste through the pipe 77 controlled by valve 78, or by circulating a cooling liquid in the absorption towers in the manner explained below.

At first the gases discharging through 27 are principally flue gases, the combustion, at first, being the complete combustion to $CO_2$ owing to the thinness of the fuel bed. As the thickness of the bed of burning coke increases the character of the gases changes, until, when the fuel bed has attained to the level of 11″—12″ the combustion of the carbon has changed, in greater part, to the incomplete combustion to CO, and a fairly good producer gas is being drawn off from the chambers. The valve 29 is now partially closed and the valve 30 opened, part of the gas passing back through the pipe 31 of the gas distributing-pipes 32 and 33. By means of a torch, or a metal rod heated to incandescence, which is introduced through the poke-holes, 34″, and the corresponding poke-holes of the other carbonizing chambers, the gas is ignited as it issues from the gas burners 35″. The air for supporting the combustion at the burners 35, of the several carbonizing chambers, is supplied under pressure by the air-blower 5, the valve 78 being closed, and passes through the pipe 36 to the distributing pipe 37 of recuperator 2. From 37 it is distributed to the headers 38, of the air flues 39 of the recuperator, passed down through 39 to the lower headers 40, up through the vertical flues 41 to the headers 42, through the connections 43 to the cross-connection 44, and thence from 44 to the air distributing pipes 46 and 47 of the carbonizing chambers, through the pipe 45. From the air distributing pipes 46″ and 47″ the air passes through the tubes 48″ and 49″ of carbonizing chamber 1″ and the corresponding air tubes of the other carbonizing chambers. Valves 50″ and 51″ on the air and gas tubes, respectively, of the burners of chamber 1″ and similar valves, on the respective connections of the other gas burners permit of the regulation of the quantity of gas and air supplied to each burner. Coke is now charged into the chambers 1, 1′, 1″ until the bed of incandescent coke has reached to the level indicated on the drawings, in Fig. 1. The door 28 is now closed. The apparatus is now in condition to start on the carbonization of the coal. Coal is charged at intervals through the charging hoppers 8, 8′, 8″, while the material at the bottom of the chambers, resting on the grates 10, of the chambers is withdrawn in corresponding volume, through the discharging apparatus 52.

The raw coal is immediately upon its entrance to the chambers subjected to the heat of the flame from burners 35, which causes the destructive distillation of the volatile hydrocarbons of the coal. The products of the distillation and the gases from the burners 35 pass downward through the bed of fuel and thence leave the chambers through the "off-takes" 11 and 12 of the several carbonizing chambers, passing to the recuperator 2 by the pipes shown, thence through the recuperator, where they are partially cooled by the air passing through the flues 39 and 41, through the conduit 18 to the first tower, 19, of the absorption apparatus 3. In passing through 3 the gases are cooled and the ammonia which they contain is absorbed by a suitable liquid, which is circulated through the towers.

The method of operating the absorption apparatus, 3, is as follows:—As shown, the absorption towers 19, 21, 23 and 25 are each provided, with a gas inlet 53, a spraying apparatus having a plurality of spraying caps 54, connected to pipe 55, a liquid sealing device, 56, and a gas outlet-chamber, 57. The sealing device, 56, consists of a false bottom, 58, fastened water-tight into the absorption chamber and holding a small depth of liquid. Short vertical pipes, 59, are inserted in the false-bottom 58 of the chamber and are covered by caps, 60, which are supported on brackets, 61, attached to the pipes 59. These caps have a sufficiently large internal diameter to leave an annular space around 59 at least equal in area to the cross-section of the pipes 59. Under the influence of the suction of the exhauster-blower, 4, the gas enters at the top of tower 19, is loaded with spray from the spraying device 54, passes to the bottom of the tower, bubbles up through the liquid seal 62 into the caps 60, thence passes down through the pipes 59 into the chamber 57, thence through the pipe 20 to tower 21, and so on to the last tower.

The spraying device which I have shown and which I prefer to use in connection with my apparatus is the one shown in my Letters Patent No. 901,597, dated Oct. 20, 1908, and consists of a plurality of spraying caps, 54, supplied with liquid under pressure by the pumps shown, through pipes 55, 55′, etc., and having perforations in their faces. The perforations are arranged in coöperating couples, 63, 63′, etc., both perforations of each couple being located in the same plane and at the same inclination to the axis of the cap. The streams discharging from the two perforations of each couple are thus caused to intersect and impinge upon each other with the production of a very fine spray. The rapidly moving gas current carries this fine mist or fog to the bottom of the chamber where it is intercepted by the liquid seal 62, while the gas passes into the caps 60 and thence through the pipes 59 into the gas chamber 57. The backward circulation of the liquid from tower to tower in the direction of the circulation of the gas is thus prevented. The pumps 64, 64′, 64″, 64‴ maintain the liquid in circulation from the seals in the lower part of the towers to the sprays at the top. A tank or reservoir, 65, holds a supply of the fresh ammonia absorbing liquid, and this is supplied to the tower 19 through the pipes 66 at a rate corresponding with the rate at which the saturated liquid is withdrawn from the tower 25, by manipulating the valve 67. Tubes, 68, 68', etc., connect the seal chambers of adjacent towers, through overflow compartments 69. These compartments are formed, simply, by riveting partitions to the bottom and cylindrical wall of the seal chambers, the top of the partition being at about the level it is designed to carry the seal. As the fresh absorbent liquid flows into the seal chamber of the tower 19, therefore, an equal volume of the liquid in the seal chamber of 19 flows through the tube 68 into the seal chamber of the tower 21, and so on, the overflow from the last tower 25 passing to the storage tank 70 for the saturated ammonia liquor.

Although the gas in passing through the recuperator 2 is partially cooled, it still has a temperature of about 400° to 500° F. When, therefore, it comes into contact with the spray at the top of 19, an evaporation of water takes place with the formation of steam, the relative volumes of gas and liquid being such that the liquid in the seal of 19 is maintained at the boiling point. The pipe 20 conducting the gas from 19 to 21 is, in reality, a condenser, water being supplied at the top of 20 in sufficient quantity to cool the gas below 212° F. The steam carried out of 19 is thus condensed and collects in the bottom of 20. This condensed water holds a considerable proportion of ammonia in solution, since the liquid in 19 is nearly saturated when it is introduced into 19, and can, therefore, only take up a small additional quantity of ammonia. The condensation from 20 is therefore used in making up fresh absorbent liquor in tank 65. It is seen, from the above, that the first tower, 19, of the absorption apparatus is, in reality, a cooling and evaporating tower, the liquor drawn off from 19 to the storage 70, having its concentration considerably increased. This is accomplished by the otherwise wasted sensible heat of the gas and is therefore so much burden saved to the evaporating apparatus, proper, which is indicated at 71.

The absorbent liquid may be any of the ones in common use but will usually be a dilute solution of sulfuric acid, the ammonia absorbed being fixed as ammonium sulfate. When this is used the final evaporation in 71 is carried to the crystallizing point.

Usually during the combustion of the coal sufficient $SO_2$ will be formed to combine with all the ammonia formed. When this is the case the ammonia can be completely absorbed as sulfite without the introduction of any extraneously formed acid or ammonia-absorbing salt. In this case only water need be supplied to the first tower.

It is apparent, that my method of absorbing the ammonia insures the most intimate contact possible between the gas and the liquid, the absorption of the ammonia being rapid and complete. I thus reduce the capacity necessary in the absorbing apparatus to a minimum.

In the destructive distillation of coal for the recovery of ammonia there are two opposing considerations in regard to the temperature at which the distillation should be conducted. In the first place, since ammonia is appreciably dissociated in contact with carbon at even so low a temperature as 1100° F., it is apparent, that the temperature should be as low as other considerations will permit. On the other hand, in order to convert the volatile nitrogen of the coal into ammonia, it is absolutely necessary to heat the coal sufficiently high to break up the compounds in which the nitrogen is held in the coal. To secure the maximum possible initial formation of ammonia during the distillation, it has been found that the primary products of the distillation must be heated to about 1700° F. In practical working, therefore, it is necessary to strike a balance between these two opposing considerations and endeavor to operate under such conditions as will give the maximum quantity of ammonia recovered. I aim to so operate my carbonizing chambers that the maximum temperature to which the distillation products are exposed is about 1500° F.

While the raw coal may be exposed to the action of a flame of much higher temperature than that stated, owing to its low conductivity and the rapid carrying off of the heat absorbed, in the distilled vapors, the high temperature cannot be allowed to extend so far into the mass of carbonizing coal as to heat the distilled products much above 1500° F. without injuriously affecting the quantity of ammonia produced. Owing to the low conductivity of the coal and the coke formed from it, starting with a high temperature flame, the flame may penetrate to a considerable distance into the mass of material in the carbonizing chamber before its temperature has been reduced to 1500° by the secondary reactions set up. The distillation products, therefore, would be exposed to an injuriously high temperature. To meet this condition, I, in the herein-revealed process, modify the temperature of the flame in the carbonizing chambers, by mixing with the air supplied to the burners sufficient stack or flue gases, or gases from the exhaust of an internal combustion engine taken from the flue 72 by means of pipe 73, to reduce the temperature of the flame to a safe point. By properly adjusting the valves 75 and 76 on the pipe 73 and air intake 74, respectively, I secure whatever mixture of flue gas and air I desire. By this addition I increase the heat capacity of the gases, per unit of gas burned, by increasing the volume of the gases. I thus limit the flame temperature to the proper point, but, still, carry enough heat into the mass of coking coal to insure a proper destructive distillation of the hydrocarbons and nitrogeneous matter, with the formation of the maximum quantity of ammonia. Further, by thus increasing the normal volume of the gases, I correspondingly increase the velocity with which they pass through the mass of carbonizing coal in the chamber and thus diminish the time during which the distilled vapors and gases are in contact with the hot coke. To still further increase the yield of ammonia, I pass through the still incandescent coke in the bottom of the carbonizing chambers the steam and gases produced in the quenching of the coke in the lowest part of the coke bed, i. e., the part resting upon the grates, 10, and below the hopper-bottom, 9, of the carbonizing chambers. The water is sprayed onto the coke on the grates from spray-caps, 79. The water is vaporized, by the hot coke, and rising up through the superincumbent layers of the unquenched coke, is partly dissociated into hydrogen, carbon dioxid, and carbon monoxid. The nascent hydrogen assists in the evolution of the final portion of the volatilizable nitrogen, as ammonia. In ordinary carbonization the coke retains, in some form, not at present definitely known, a large proportion of the total nitrogen of the raw coal, usually, about, 50%. By subjecting the hot coke, in the manner just described, to the influence of an atmosphere rich in nascent hydrogen I am able to convert into ammonia and recover a considerable part (about $\frac{1}{3}$) of this usually fixed nitrogen and thus greatly increase the quantity of ammonia that I recover.

Having described my invention, what I claim is:

1. The process for producing ammonia from coal, which consists, in subjecting said coal to direct contact with a gas flame, whereby the volatile nitrogeneous matter of said coal is distilled therefrom, passing the said distilled nitrogeneous matter in contact with incandescent coke, whereby the said nitrogeneous matter initially distilled from said coal is further dissociated with the formation of ammonia, and recovering the ammonia from the gaseous products distilled from said coal by said gas flame by contacting said gaseous products of distillation with an atomized liquid capable of absorbing ammonia, substantially as described.

2. The process for producing ammonia from coal, which consists, in subjecting said coal to direct contact with a gas flame, whereby the volatile nitrogeneous matter of said coal is distilled therefrom; passing the said distilled nitrogeneous matter in contact with incandescent coke, whereby the said nitrogeneous matter initially distilled from said coal is further dissociated with the formation of ammonia; and recovering the ammonia from the gaseous products distilled from said coal by said gas flame, by contacting said gaseous products of distillation with a liquid capable of absorbing ammonia, substantially as described.

3. The process for producing ammonia from coal, which consists, in subjecting said coal to direct contact with a gas flame, whereby, the volatile nitrogeneous matter of said coal and the volatile hydrocarbons of said coal are distilled therefrom; passing the said distilled matter in contact with incandescent coke, whereby, the said hydrocarbons and the volatile nitrogeneous matter, are further dissociated, with the formation of ammonia; and recovering the ammonia from the gaseous products of the reactions by contacting the said gaseous products with a liquid capable of absorbing ammonia, substantially as described.

4. The process for producing ammonia from coal, which consists, in subjecting said coal to direct contact with a gas flame, whereby, the volatile nitrogeneous matter of said coal and the volatile hydrocarbons of said coal are distilled therefrom; passing the said distilled matter in contact with incandescent coke; whereby, the said hydrocarbons and the volatile nitrogeneous matter are further dissociated with the formation of ammonia and other gases; withdrawing from contact with said coke the commingled gaseous products; cooling said products; and recovering the ammonia from said cooled products by subjecting the same to contact with a liquid capable of absorbing ammonia, substantially as described.

5. The process of recovering ammonia from coal, which consists, in coking said coal by direct contact with a gas flame; passing the products distilled from said coal in said coking operation in contact with coke from a previous charge of coal, whereby, the distilled nitrogeneous matter from said coal is dissociated with the formation of ammonia; quenching the said coke with water; passing the water vapor formed in said quenching operation in contact with incandescent coke, whereby, reactions are caused to take place between a portion of said water vapor and said coke and a portion of the nitrogen of said coke, with the formation of ammonia; withdrawing, from contact with said coke, the gases formed in the coking operation and the gases formed in the quenching operation in a common current; and recovering the ammonia from said gases by contacting the same with a liquid capable of absorbing ammonia, substantially as described.

6. The process of recovering ammonia from coal, which consists, in coking said coal by direct contact with a gas flame; passing the products distilled from said coal in said coking operation in contact with coke from a previous charge of coal; whereby the distilled nitrogeneous matter from said coal is dissociated with the formation of ammonia; quenching the said coke with water; passing the water-vapor formed in said quenching operation in contact with incandescent coke, whereby reactions are caused to take place between a portion of said water vapor and said coke and a portion of the nitrogen of said coke, with the formation of ammonia; withdrawing from contact with said coke the gases formed in the coking operation, and the gases formed in the quenching operation in a common current; passing said gases through the gas flues of a recuperator, whereby, a portion of the sensible heat of said gases is transferred to a current of air passing through the air passages of said recuperator; conducting such heated air to the gas flame to sustain the combustion therein; conducting the gases after they leave said recuperator to an absorbing apparatus; and recovering the ammonia from said gases by contacting the said gases with a liquid capable of absorbing ammonia, substantially as described.

7. The process of recovering ammonia from coal, which consists, in subjecting said coal in an inclosed chamber to direct contact with a gas-flame of regulated intensity, the intensity of said flame being regulated by the introduction of a regulated proportion of combustion gases into the air current supplied to said flame; passing the products distilled from said coal by said flame in contact with coke from a previous charge of coal, whereby the said distilled products are subjected to partial dissociation with the formation of ammonia; and recovering the ammonia by contacting the so formed gases with a liquid capable of absorbing ammonia, substantially as described.

8. The process of recovering ammonia from coal, which consists, in subjecting said coal to destructive distillation by direct contact with a modified gas flame, said gas flame being modified by admixing with the air current supplied to said flame, a regulated proportion of combustion gases, whereby the temperature of said flame is reduced below the temperature at which ammonia spontaneously dissociates, and recovering from the gaseous products of such destructive distillation the ammonia formed by such distillation, substantially as described.

9. The process of recovering ammonia from coal, which consists, in subjecting said coal to distillation by direct contact with a modified gas flame, said gas flame being modified by admixing with the air current supplied to said flame, a regulated proportion of combustion gases, whereby the temperature of said flame is reduced below the temperature of dissociation of ammonia; passing the products of such distillation in contact with coke from a previous charge of coal, whereby, the products formed in the initial distillation of the coal are partially dissociated with the formation of ammonia and other gases; quenching the coke with water; passing the water vapor formed in said quenching operation in contact with incandescent coke, whereby, reactions are caused to take place between a portion of said water vapor and of the carbon of said coke and a portion of the nitrogen of said coke, with the formation of ammonia; withdrawing from contact with said coke the gases formed in the distilling operation and the gases formed in the quenching operation in a common current; and recovering the ammonia from said gases by contacting the same with a liquid capable of absorbing ammonia, substantially as described.

10. The process of recovering ammonia from coal, which consists, in subjecting said coal to distillation by direct contact with a modified gas flame, said gas flame being modified by admixing with the air current supplied to said flame, a regulated proportion of combustion gases, whereby the temperature of said flame is reduced below the temperature of dissociation of ammonia; passing the products of such distillation in contact with coke from a previous charge of coal, whereby, the products formed in the initial distillation of the coal are in part dissociated with the formation of ammonia and other gases; quenching the coke with water; passing the water-vapor formed in the said quenching operation in contact with incandescent coke, whereby, reactions are caused to take place between a portion of said water vapor, a portion of the carbon of the coke, and a portion of the nitrogen of the coke, with the formation of ammonia; withdrawing from contact with said coke the gases formed in the distilling operation and the gases formed in the quenching operation in a common current; passing said gases through a recuperator, whereby the major portion of their sensible heat is transferred to an air current; conducting said heated air current to said flame to support the combustion in said flame; conducting the cooled gases to an absorbing apparatus and contacting them therein with a liquid capable of absorbing ammonia, substantially as described.

11. The process of recovering ammonia from coal, which consists, in charging said coal onto a column of coke in a coking chamber; subjecting said coal to direct contact with a modified gas flame, said flame being modified by admixing with the air current supplied to said flame, a regulated proportion of combustion gases, whereby the temperature of said flame is reduced to a temperature not exceeding 1800° F.; passing the products of combustion from said gas flame and the distillation gases from the coal in contact with the coke in, substantially, the upper half of said coke column, whereby, the initially formed products of such distillation are caused to undergo further dissociation with the formation of ammonia and other gases, and the $CO_2$ and $H_2O$ of said combustion gases are in major part dissociated to $CO$ and $H_2$; quenching the lower part of said coke column with water; passing the water vapor so formed in contact with the incandescent coke in substantially the lower half of said coke column; withdrawing from said coking chamber the gases formed therein in a common current; passing said gases through a recuperator to heat the air supplied to sustain combustion in said gas flame; conducting the so-heated air to the air passage of the gas burners of said coking chamber; conducting the partially cooled gas to an ammonia-scrubber; recovering the ammonia from said gases in said ammonia-scrubber by contacting the said gases with a dilute solution of sulfuric acid; said solution being introduced into said gases as a fog free from droplets of sensible size; recovering such fog from said gases after the ammonia of such gases has been absorbed by said fog by passing the said fog-laden gases through a liquid seal consisting of a liquid containing dilute sulfuric acid; and conducting a portion of the ammonia-free gas back to the gas passages of the gas burners of said coking oven, substantially as described.

Signed at New York city, in the county of New York and State of New York, this 22nd day of Dec. 1909.

HENRY L. DOHERTY.

Witnesses:
 THOS. I. CARTER,
 W. J. QUENTIN.